(12) United States Patent  (10) Patent No.: US 8,855,049 B2
Vedrine et al.  (45) Date of Patent: Oct. 7, 2014

(54) MOBILE SWITCHING CENTRE SERVER

(75) Inventors: Arnaud Vedrine, Paris (FR); Saso Stojanovski, Paris (FR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 12/985,342

(22) Filed: Jan. 6, 2011

(65) Prior Publication Data

US 2011/0164564 A1     Jul. 7, 2011

Related U.S. Application Data

(60) Provisional application No. 61/292,789, filed on Jan. 6, 2010.

(51) Int. Cl.
*H04W 4/00* (2009.01)
*H04W 36/00* (2009.01)
*H04W 88/14* (2009.01)
*H04W 36/14* (2009.01)

(52) U.S. Cl.
CPC .......... *H04W 36/0033* (2013.01); *H04W 88/14* (2013.01); *H04W 36/14* (2013.01)
USPC ....................................................... 370/328

(58) Field of Classification Search
CPC ............. H04W 36/0022; H04W 36/14; H04L 65/1083; H04L 65/1016; H04L 29/06217
See application file for complete search history.

(56) References Cited

U.S. PATENT DOCUMENTS

| | | | |
|---|---|---|---|
| 2002/0061756 A1* | 5/2002 | Bleckert et al. | 455/458 |
| 2002/0137532 A1* | 9/2002 | Landais et al. | 455/466 |
| 2009/0052460 A1* | 2/2009 | Coulas et al. | 370/401 |
| 2009/0073936 A1* | 3/2009 | Jentz et al. | 370/331 |
| 2009/0080382 A1* | 3/2009 | Chen et al. | 370/331 |
| 2009/0219848 A1* | 9/2009 | Lohmar et al. | 370/312 |
| 2009/0270099 A1* | 10/2009 | Gallagher et al. | 455/435.1 |
| 2009/0275309 A1* | 11/2009 | He | 455/410 |
| 2010/0056156 A1* | 3/2010 | Xu et al. | 455/436 |
| 2010/0220680 A1* | 9/2010 | Ramankutty et al. | 370/329 |
| 2010/0220862 A1* | 9/2010 | Geary et al. | 380/272 |
| 2010/0304749 A1* | 12/2010 | Dwyer et al. | 455/443 |
| 2011/0009120 A1* | 1/2011 | You et al. | 455/436 |
| 2011/0110326 A1* | 5/2011 | Rexhepi et al. | 370/331 |

(Continued)

FOREIGN PATENT DOCUMENTS

EP     1 983 796 A1    10/2008

OTHER PUBLICATIONS

Sauter (Sauter, Martin, Voice over LTE via Generic Access (VoLGA) A Whitepaper—Aug. 2009 V 1.0, Aug. 2009, http://www.wirelessmoves.com).*

(Continued)

*Primary Examiner* — Brian J Gillis
*Assistant Examiner* — Michael A Keller
(74) *Attorney, Agent, or Firm* — Morgan, Lewis & Bockius LLP

(57) ABSTRACT

MSC server enhanced for rSRVCC from UTRAN/GERAN to E-UTRAN/HSPA, comprising:
 a reception block (10) configured to receive an rSRVCC capability indication from a user equipment;
 a decision block (11) configured to determine whether rSRVCC is allowed for a given call based on the rSRVCC capability indication received; and
 a transmitting block (12) configured to send to a Radio Access Network (RNS/BSS), when rSRVCC has been determined as allowed, an rSRVCC possible indication indicating that a rSRVCC is possible.

13 Claims, 3 Drawing Sheets

(56) References Cited

U.S. PATENT DOCUMENTS

2011/0249652 A1* 10/2011 Keller et al. ............... 370/331
2011/0275377 A1* 11/2011 Wu et al. .................... 455/436
2011/0294458 A1* 12/2011 Tiwari ....................... 455/404.1

OTHER PUBLICATIONS

3GPP TR 33.821 (3GPP TR 33.821, 3rd Generation Partnership Project Technical Specification Group Services and System Aspects Rationale and track of security decisions in Long Term Evolved (LTE) RAN / 3GPP System Architecture Evolution (SAE) (Release 9), Jun. 2009, 3GPP please see at least section 7.4.13.5 Key handling on handover from UTRAN to E-UTRA.*

3GPP TS 23.216 V8.3.0, "3rd Generation Partnership Project; Technical Specification Group Services and System Aspects; Single Radio Voice Call Continuity (SRVCC); Stage 2 (Release 8)," 3GPP, pp. 1-33, Mar. 2009.

3GPP TS 23.237 V9.3.0, "3rd Generation Partnership Project; Technical Specification Group Services and Architecture; IP Multimedia Subsystem (IMS) Service Continuity," Stage 2 (Release 9), 3GPP, pp. 1-89, Dec. 2009.

International Search Report dated Sep. 28, 2011, issued in corresponding PCT application PCT/KR2011/000051.

* cited by examiner

MOBILE SWITCHING CENTRE SERVER

CROSS-REFERENCE

The present application claims priority benefit to the following applications, which contents are all incorporated by reference herein: U.S. Provisional Application No. 61/292,789 filed on Jan. 6, 2010.

TECHNICAL FIELD

The present invention generally relates to devices for providing a network with the capability to determine whether a voice call, established over UTRAN/GERAN network, can be candidate to perform an rSRVCC procedure to transfer the voice call to E-UTRAN/HSPA network.

BACKGROUND

Single Radio Voice Call Continuity (SR-VCC) has been standardized in 3GPP TS 23.216, version 9.2.0: Single Radio Voice Call Continuity (SRVCC); Stage 2, to provide continuity when a single radio capable User Equipment (UE) moves from E-UTRAN/HSPA (Evolved UMTS Terrestrial Radio Access Network/High Speed Packet Access) to UTRAN/GERAN (UMTS Terrestrial Radio Access Network/GSM EDGE Radio Access Network) while engaged in a voice call established over IP Multimedia Subsystem (IMS).

In this specification, only the E-UTRAN/HSPA to UTRAN/GERAN direction is addressed.

How to perform subsequent handovers in the reverse direction ("handback") was studied at the time, and a solution was proposed in 3GPP TS 23.216, version 1.1.0: Single Radio Voice Call Continuity (SRVCC); Stage 2. But it then got subsequently removed from the specification.

For a reverse SRVCC (rSRVCC) from UTRAN/GERAN to E-UTRAN/HSPA to succeed for a given voice call based on the solution studied, a number of prerequisites are needed.

One example is the anchoring of the call in an IMS application server called SCC AS (Session Continuity Control Application Server) at its establishment: the studied solution reuses the Service Continuity mechanisms defined in 3GPP TS 23.237, version 9.4.0: IP Multimedia Subsystem (IMS) Service Continuity; Stage 2, which assume that the sessions that can be transferred between accesses are routed through IMS and through the SCC AS at the time of their establishment. The source access network (i.e. the RNS or BSS) needs to distinguish between calls anchored in the SCC AS and calls which have not been anchored before triggering the rSRVCC procedure. How this should be done was one of the main open issues that remained unsolved in 3GPP TS 23.216, version 1.1.0.

Other prerequisites for triggering of the rSRVCC procedure include the CS core network knowledge of UE's rSRVCC capability or the UE's IMS registration status, and need to be taken into account as well.

FIG. 1 represents how a call flow for subsequent SRVCC handback from UTRAN or GERAN with DTM/PSHO support to E-UTRAN, including the handling of the non-voice component, looked like in the solution that was briefly documented in 3GPP TS 23.216 v1.1.0, before being removed from the subsequent versions of TS 23.216.

In step S1, the source RNS decides to trigger a handover to E-UTRAN based on UE measurement reports.

In step S2, the source RNS initiates PS relocation.

Step S2 comprises an operation S2a of sending, from the source RNS, a Relocation Required (Source to Target Transparent Container) message to source SGSN (Serving GPRS Support Node).

Step S2 comprises an operation S2b of sending, from the source SGSN, a Forward Relocation Request message to the target MME (Mobility Management Entity) including information about the non-voice component only.

In step S3, the source RNS initiates CS relocation. Step S3 is performed in parallel to step S2.

Step S3 comprises an operation S3a of sending, from the source RNS, a Relocation Required (Source to Target Transparent Container) message to the source MSC (Mobile Switching Centre).

Step S3 comprises an operation S3b of sending, from source MSC, a Prepare Subsequent HO Request to the MSC Server.

Step S3 comprises an operation S3c of sending, from the MSC Server, a Forward Relocation Request (Source to Target Transparent Container) message to the target MME.

In step S4, the target MME synchronises the two Forward Relocation Request messages and requests resource allocation for the non-voice component only by exchanging Handover Request/Acknowledge messages with the target E-UTRAN.

In step S5, the target MME acknowledges the prepared CS relocation towards the source access.

Step S5 comprises an operation S5a of sending, from the target MME, a Forward Relocation Response (Target to Source Transparent Container) message to the MSC Server.

Step S5 comprises an operation S5b of sending, from the MSC Server, a Prepare Subsequent HO Response to the source MSC.

Step S5 comprises an operation S5c of sending, from the source MSC, a Relocation Required Acknowledge (Target to Source Transparent Container) message to the source RNS.

In step S6, the target MME acknowledges the prepared PS relocation towards the source access. Step S6 is performed in parallel to step S5.

Step S6 comprises an operation S6a of sending, from the target MME, a Forward Relocation Response (Target to Source Transparent Container) message to the source SGSN.

Step S6 comprises an operation S6b of sending, from the source SGSN, a Relocation Required Acknowledge (Target to Source Transparent Container) message to the source RNS.

In step S7, the source RNS synchronises the two Relocation Required Acknowledge messages and sends a Handover from UTRAN Command message to the UE.

In step S8, UE re-tunes to E-UTRAN radio and sends a Handover to E-UTRAN Complete message to the E-UTRAN.

In step S9, the target E-UTRAN informs the target MME by sending a Handover Notify message.

In step S10, the target MME completes the CS relocation.

Step S10 comprises an operation S10a of sending, from the target MME, a Forward Relocation Complete message to the MSC Server. MSC Server acknowledges the information by sending a Forward Relocation Complete Acknowledge message to the source MME.

Step S10 comprises an operation S10b of sending, from the MSC Server, a Handover Complete message to the source MSC.

In step S11, the target MME completes the PS relocation. Step S11 is performed in parallel to step S10.

Step S11 comprises an operation of exchanging, between the target MME and the source SGSN, Forward Relocation Complete/Acknowledge messages.

Step S11 further comprises an operation of performing, at the target MME, the Update bearer procedure with the Serving GW and the PDN GW. At this point the relocation of all non-voice PS bearers is completed and the user data are flowing across E-UTRAN access in both directions.

In step S12, UE performs a TAU procedure if required (e.g. due to UE mobility under CS coverage).

Subsequently, in step S13, UE initiates the Session Transfer procedure e.g. by sending a SIP INVITE (VDI) message to the VCC application. Standard IMS Service Continuity procedures are applied for execution of the Session Transfer, as described in 3GPP TS 23.237, version 9.4.0: IP Multimedia Subsystem (IMS) Service Continuity; Stage 2, and in 3GPP TS 23.292, version 9.4.0: IP Multimedia Subsystem (IMS) centralized services; Stage 2. As part of this procedure the remote end is updated with the SDP of the IMS access leg. The downlink flow of VoIP packets is switched towards the PDN GW at this point.

In step S14, the IMS triggers a network-initiated dedicated bearer for the voice component.

In step S15, the IMS releases the CS access leg which result in release of resources in the MSC Server.

In this solution, the RNS is the entity that decides whether the UE should report measurement on neighbouring E-UTRAN cells, and, in case those measurements prove to be good enough, to handover the UE to E-UTRAN. For it to make such a decision, it needs to be sure that the procedure, if initiated, can succeed. For that to be true, several prerequisites exist.

The UE is supposed to perform a number of actions throughout the procedure. That means there exists an rSRVCC capability that needs to be supported by the UE. UEs which do not support the rSRVCC capability must not be requested by the network to perform measurements on neighbouring E-UTRAN cells for the purpose of rSRVCC.

In step S13 described above, the signaling that takes place for the downlink flow of VoIP packets to be switched to the PDN GW is the sending of an INVITE message from the UE to the SCC AS. That INVITE message contains an identity which allows the SCC AS to correlate it with the previously established voice call. At the reception of this INVITE message, the SCC AS will update the remote end with the new connection information (IP address, ports) from/to which the media will be received/need to be sent.

Step S13 is described with further detail referring to FIG. 2.

In step S101, the UE initiates registration with IMS (if not already registered in IMS). Step S101 is performed when the UE determines a need for Access Transfer.

Subsequently, the UE initiates an IMS originated session toward the SCC AS using a STI to establish an Access Leg via PS access and requests Access Transfer of the IMS session that is using CS media to PS access. The statically configured STI is used if no dynamically assigned STI has been provided to the UE during session establishment.

In step S102, standard procedures are used at S-CSCF for routing of the INVITE to the SCC AS.

In step S103, the SCC AS performs the Access Transfer by updating the Remote Leg with connection information of the newly established Access Leg.

In step S104, the source Access Leg which is the Access leg previously established over CS is subsequently released.

The PS-CS Access Transfer procedure described in FIG. 2 assumes that an SCC AS exists in the IMS domain that can accept that INVITE message, and correlate it with the call that was previously established on the UTRAN/GERAN side. That boils down to two more prerequisites. Firstly, the call have to be routed through (or "anchored at") an SCC AS. Secondly, the user has to be authorized for rSRVCC.

Last, before sending an INVITE message the UE needs to be registered to IMS. Even though this could be performed by the UE as part of the rSRVCC procedure on the fly (e.g. between step S12 and step S13), performing an IMS registration is time consuming, and having the UE register to IMS in the middle of the handover would incur an important additional delay which would impact the user experience in a negative way (long speech interruption). The IMS registration state of the UE is therefore also an aspect that should be taken into consideration in the decision making process for initiating rSRVCC to E-UTRAN. Note though that while the previously mentioned prerequisites are mandatory, an rSRVCC to E-UTRAN could succeed without this last one.

Embodiments of the present invention will improve the situation. In particular, embodiments of the present invention will propose a set of mechanisms for providing the network with the capability to discriminate the calls which meet the prerequisites for successful rSRVCC to E-UTRAN/HSPA. Such mechanisms are required in the context of the aforementioned solution, and could also be in the context of other solutions for rSRVCC to E-UTRANHSPA yet to be defined.

SUMMARY

To address these needs, an aspect of the present invention relates to a MSC server enhanced for rSRVCC from UTRAN/GERAN to E-UTRAN/HSPA, comprising:
- a reception block configured to receive an rSRVCC capability indication from a user equipment,
- a decision block configured to determine whether rSRVCC is allowed for a given call based on the rSRVCC capability indication received, and
- a transmitting block configured to send to a Radio Access Network (RNS/BSS), when rSRVCC has been determined as allowed, an rSRVCC possible indication indicating that a rSRVCC is possible.

The rSRVCC capability indication may be received via a SGSN or directly.

The decision block may further be configured to determine whether rSRVCC is allowed for a given call based on an authorization of the user for rSRVCC. The authorization of the user for rSRVCC may be received at the MSC server from a home subscriber server (HSS).

The decision block may further be configured to determine whether rSRVCC is allowed for a given call based on an IMS registration status of user equipment.

The decision block may further be configured to determine whether rSRVCC is allowed for a given call based on a prior anchoring of the voice call in the SCC AS.

BRIEF DESCRIPTION OF THE DRAWINGS

The present invention is illustrated by way of example, and not by way of limitation, in the figures of the accompanying drawings, in which same reference numerals refer to similar elements and in which.

DESCRIPTION OF PREFERRED EMBODIMENTS

Embodiments of the invention deal with the problem of providing a network with the capability to determine whether a voice call, established between a first UE and a second UE over UTRAN/GERAN, can be candidate to perform an rSRVCC procedure to transfer the voice call to E-UTRAN network.

Figure 1:
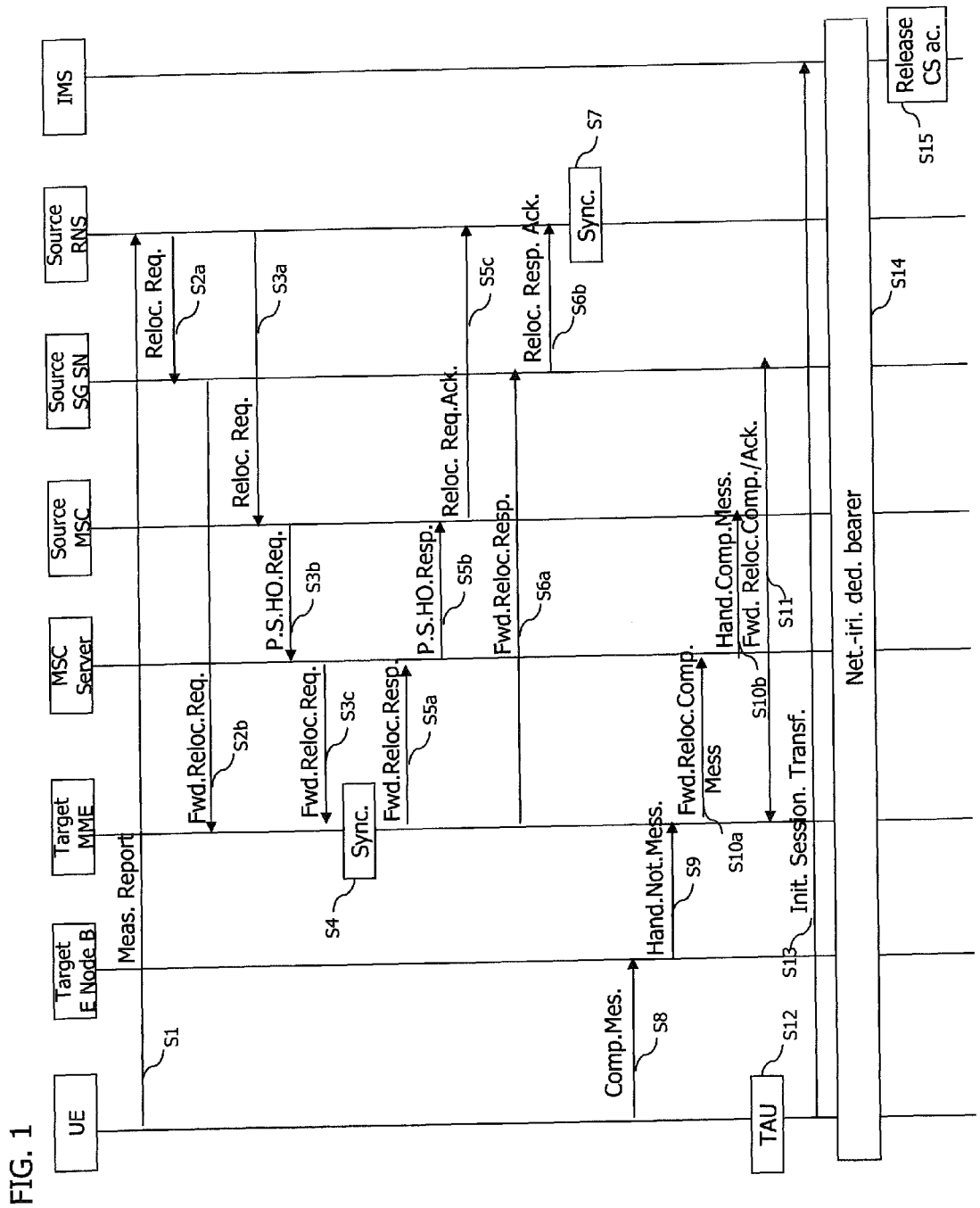
FIG. 1 is a schematic diagram showing steps of a method for performing a rSRVCC procedure.
Figure 2:
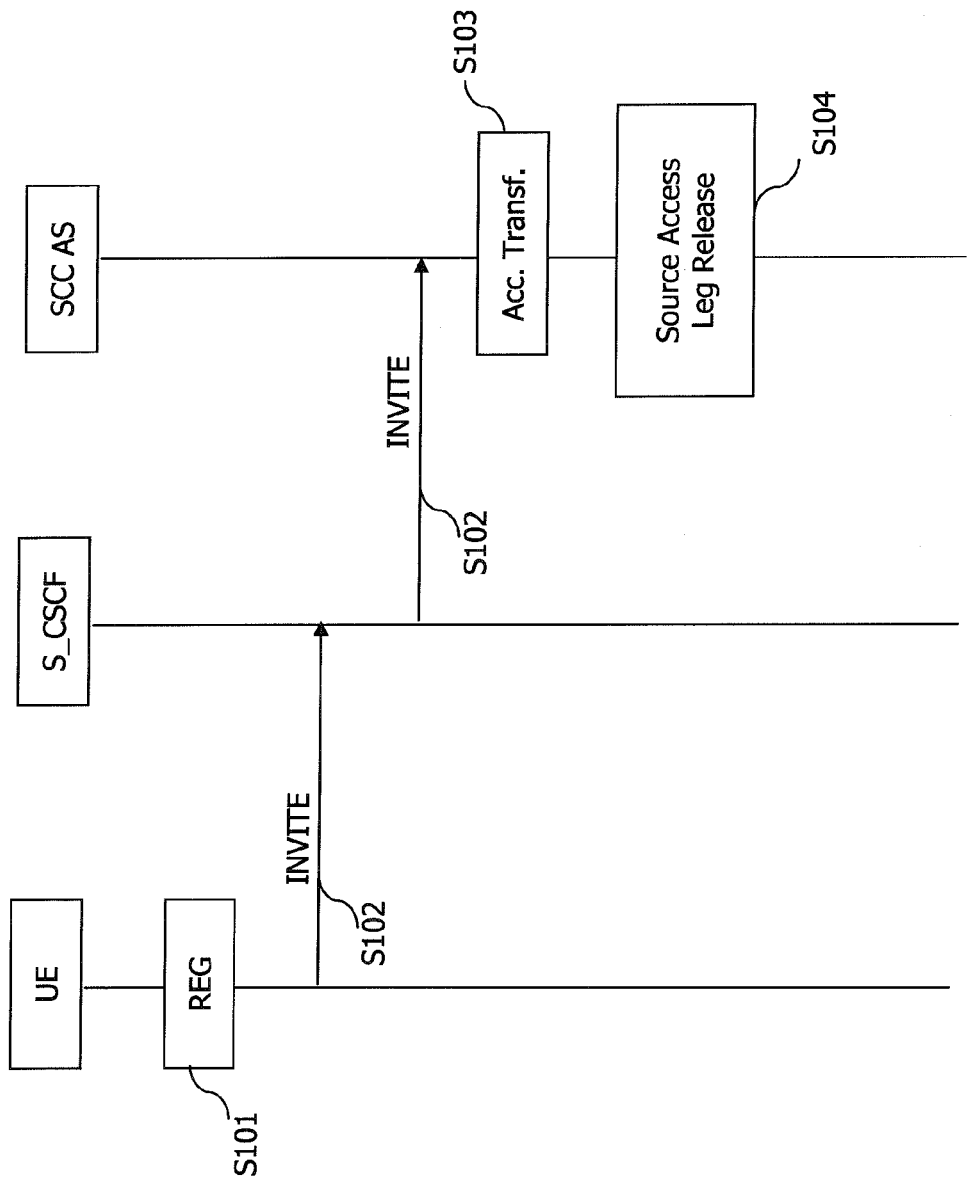
FIG. 2 is a schematic diagram showing in more detail a step of the method represented in FIG. 1.
Figure 3:
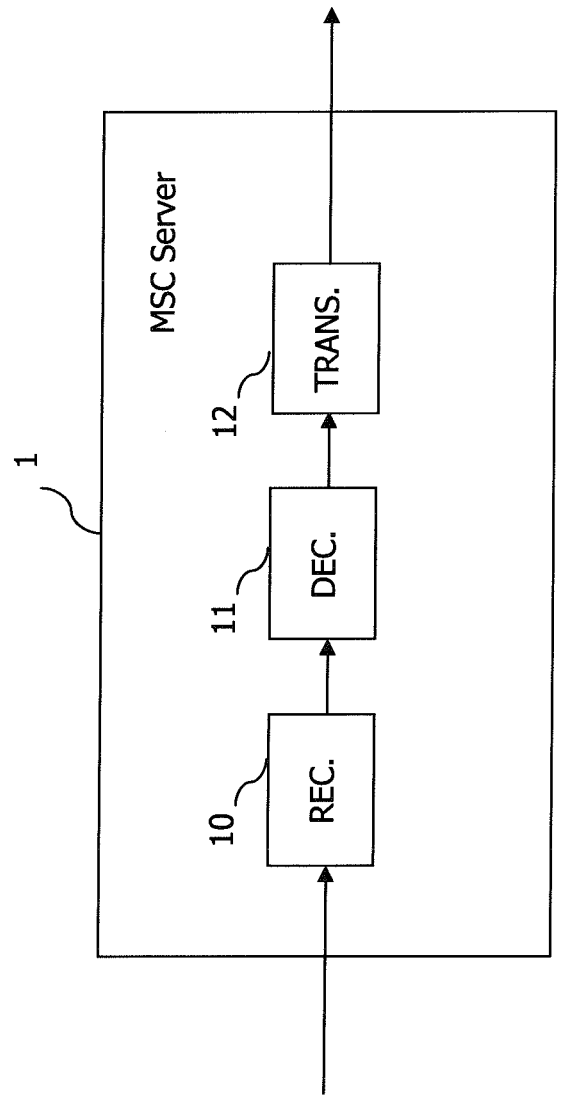
FIG. 3 is a schematic block diagram of a Mobile Switching Centre (MSC) server according to embodiment of the invention.

FIG. 3 represents an MSC server 1 of a UTRAN/GERAN network. The MSC server 1 is configured to perform an rSRVCC procedure on a voice call initially established on UTRAN/GERAN network, for example on the voice call established between the first UE and the second UE.

The MSC server 1 comprises a reception block 10 configured to receive information related to a rSRVCC capability of the UE, to a prior anchoring of the voice call in the SCC AS, to an authorization of the user for rSRVCC, and to an IMS registration status of the UE.

The MSC server 1 comprises a decision block 11 configured to decide whether the voice call can be candidate to perform an rSRVCC procedure to transfer the voice call to E-UTRAN network. The decision block 11 uses the information received as criteria to determine whether the voice call can be candidate to perform an rSRVCC procedure. The MSC server 1 enhanced for rSRVCC is thus the entity that decides whether a given voice call can be candidate to rSRVCC to E-UTRAN.

The MSC server 1 comprises a transmitting block 12 configured to send to a Radio Access Network (RNS/BSS), when the voice call has been determined as candidate, an rSRVCC possible indication indicating that an rSRVCC procedure is possible.

The rSRVCC possible indication indicates that rSRVCC can be triggered from UTRAN/GERAN to E-UTRAN if a E-UTRAN has a good enough quality. The rSRVCC possible indication will trigger the RNS/BSS to have the UE measure E-UTRAN cells, and report those that the call could be handed over to. When such a report is received, the RNS/BSS can then trigger a rSRVCC from UTRAN/GERAN to E-UTRAN/HSPA.

Two Network Mode of Operations (NMO) are defined in 3GPP TS 23.060, version 9.3.0: General Packet Radio Service (GPRS); Service description; Stage 2.

A network in A/Gb mode is a network in which the functional division between the radio access network and the core network is in accordance with the use of an A or a Gb interface. In this operation mode, the MSC server 1 includes an rSRVCC possible indication to the RNS/BSS at call set up in the Assignment Request sent over the A interface.

A network in Iu mode refers to a network in which the functional division between the radio access network and the core network is in accordance with the use of an Iu-CS or Iu-PS interface. In this operation mode, the MSC server 1 includes an rSRVCC possible indication to the RNS/BSS at call set up in the RAB Assignment Message sent over the Iu-CS interface.

If the CS domain call is subject to radio-level handover (e.g. intra-RAT, inter-RAT, intra-MSC, inter-MSC, etc) while remaining in the CS domain, the rSRVCC possible indication needs to be forwarded to the target radio access (RNS/BSS) provided that it still applies.

As described above, the decision to perform an rSRVCC is based on information received at the MSC server 1. This information comprises several types of information. For each type of information, mechanisms are provided for the MSC server 1 to determine whether criteria related to this type of information is fulfilled or not.

A first type of information used by the MSC server 1 is related to the rSRVCC capability of the UE. The rSRVCC capable UE sends a rSRVCC capability indication to the network, either to the MSC server 1 directly, or to a SGSN which will then convey it to the MSC server 1.

The Network Mode of Operation defines how the coordination between the CS and the PS domain is realized, when it comes to the mobility management procedures and to the paging procedures. For a network in Iu mode, NMO type I and NMO type II are defined, while in a network in A/Gb mode, NMO types I, II and III are defined.

NMO Type I indicates that the Gs interfaces exists between the SGSN and the MSC server 1. In such a case, the mobility management procedures are performed towards the PS domain (i.e. the SGSN), which will then trigger the corresponding mobility management procedures towards the CS domain (i.e. the MSC). We then talk about Combined GPRS/IMSI Attach, and about Combined RA/LA Update procedure.

NMO type II and NMO type III (in the case of A/Gb mode) indicate that the Gs interface does not exist between the SGSN and the MSC server 1. In that case, the UE performs distinct procedures towards the PS and the CS domain (GPRS Attach towards the PS domain, and IMSI Attach towards the CS domain; Routing Area Update procedure towards the PS domain, and Location Area Update procedure towards the CS domain).

In case of a network of NMO type I, the rSRVCC capability indication is sent by the UE in the Attach Request message sent to the SGSN at combined GPRS/IMSI Attach, and in the Routing Area Update Request message at combined RA/LA Update. If received by the SGSN, the rSRVCC capability indication is transmitted by the SGSN to the MSC server 1 in the Location Updating Procedure.

In case of a network of NMO types II or III, the rSRVCC capability indication is sent by the UE in the Location Updating Request it sends to the network. The Location Updating Request message is used in this case both for the UE to attach to the network, and also to handle the location area updates which are necessary as the UE moves once attached.

A second type of information used by the MSC server 1 is related to prior anchoring of the voice call in the SCC AS.

When established, a voice call can either be anchored in the SCC AS by the mobile itself, or by an MSC server 1 enhanced for IMS Centralized Services.

IMS Centralized Services provides communication services such that all services, and service control, are based on IMS mechanisms and enablers. It enables IMS services when using CS access (e.g. 3GPP TS 24.008, version 9.1.0: Mobile radio interface Layer 3 specification; Core network protocols; Stage 3) for the media bearer.

To realize such a centralization, either the network can be enhanced (introducing so called "MSC server enhanced for ICS"), or the UE can (introducing so called "ICS UE").

The ICS UE is an IMS UE enhanced with ICS capability. The ICS UE provides, among others, the function of communicating with the SCC AS for service control signalling, the service control signalling referring to the signalling that is used to invoke or control services. The ICS UE further provides the function of establishing the Bearer Control Signalling Path to setup the media through the CS domain, the bearer control signalling referring to the signalling that is used to set up the media resources required for a given call. The ICS UE further provides the function of executing Access Domain Selection for originating sessions. So, they are four cases in which the call is anchored in the SCC AS.

In a first case the call was initiated by the UE on UTRAN/GERAN using CS domain procedures and the MSC server 1 is enhanced for ICS. In this case, the MSC server 1 enhanced for rSRVCC which is also ICS capable knows which call it has anchored in the SCC AS (as it is the one that generates the SIP signaling), so it will be possible for it to mark such calls as "anchored".

In a second case the call was initiated on E-UTRAN or HSPA with VoIMS support, and then handed over to UTRAN/ GERAN. In this case the MSC server 1 has been involved in the handover procedure and knows the call has been anchored in the SCC AS, so it can mark it as "anchored".

In a third case the call was initiated on UTRAN/GERAN by a UE enhanced for ICS. In this case, rSRVCC capable UEs which are also ICS capable shall be enhanced to include an IMS anchoring performed indicator in a CS CALL SETUP message corresponding to bearer control signalling for a call established using Gm or I1. The presence of that indicator shall be understood by the MSC server 1 enhanced for rSRVCC as the fact that the UE has anchored the call in IMS using ICS capabilities.

In a fourth case the call was initiated on UTRAN/GERAN side and anchored in the SCC AS using CAMEL trigger for redirecting the call to IMS.

A third type of information used by the MSC server 1 is related to a user authorization for rSRVCC.

If the subscriber is allowed to have rSRVCC, a rSRVCC allowed indication is included in the Insert Subscriber Data sent to the MSC server 1 at Attach or at Location Area Update.

A fourth type of information used by the MSC server 1 is related to an IMS registration status of the UE.

Two mechanisms can be used to report the IMS registration status of the UE to the MSC server 1.

According to a first mechanism, the UE includes an IMS registration performed indicator in the CS call setup message it sends to the MSC server 1 at call origination and in the Call Confirmed message at call termination. For ICS UE this piece of information is implicitly signalled with the information of prior anchoring.

According to a second mechanism, the MSC server 1 gets notified by the HSS about the IMS registration status of the UE over the MAP/D interface.

While there has been illustrated and described what are presently considered to be preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A Mobile Switching Centre (MSC) server enhanced for a voice call continuity from UTRAN/GERAN (UMTS Terrestrial Radio Access Network/GSM EDGE Radio Access Network) to E-UTRAN/HSPA (Evolved UMTS Terrestrial Radio Access Network/High Speed Packet Access) which is reverse to a direction from E-UTRAN or HSPA to UTRAN or GERAN in a network, comprising:
   a transceiver configured for transmitting and/or receiving a radio signal; and
   a processor operatively coupled to the transceiver and configured for:
      acquiring an rSRVCC (reverse Single Radio Voice Call Continuity) capability indication of a user equipment (UE) related to the voice call continuity from the UTRAN or GERAN to the E-UTRAN or HSPA,
         wherein, if the network operates in Network Mode of Operation (NMO) type I, the rSRVCC capability indication is originated from an attach request message sent by the UE and received via a serving GPRS (General Packet Radio Service) support node (SGSN), and
         wherein, if the network operates in Network Mode of Operation (NMO) type II, the rSRVCC capability indication is sent by the UE;
      receiving a subscriber data including an rSRVCC allowed indication indicating whether the voice call continuity is allowed or not for a user, wherein the subscriber data including the rSRVCC allowed indication is received during an attach procedure for the UE from a home subscriber server (HSS);
      determining whether the voice call continuity from the UTRAN or GERAN to the E-UTRAN or HSPA is possible or not, based on all of:
         the rSRVCC capability indication;
         the rSRVCC allowed indication; and
         a status of a registration of the UE; and
      transmitting an indicator for indicating whether the voice call continuity is possible or not based on the determination result to a base station controller (BSC) or a radio network controller (RNC).

2. The MSC server according to claim 1, wherein, if the network operates in NMO type III, the rSRVCC capability indication is acquired directly from the UE.

3. The MSC server according to claim 1, wherein the rSRVCC allowed indication is acquired from the HSS when the UE performs a registration.

4. The MSC server according to claim 1, wherein, in the determination operation, determining whether a voice call of the UE was initiated by the UE on UTRAN/GERAN and anchored in a Service Centralization and Continuity Application Server (SCC AS).

5. The MSC server of claim 1, wherein the indicator is used to decide cells for which the UE reports measurements that lead to handover.

6. The MSC server according to claim 1, wherein the processor is further configured for checking the status of the registration.

7. A method for controlling a voice call continuity from UTRAN (UMTS Terrestrial Radio Access Network) or GERAN (GSM EDGE Radio Access Network) to E-UTRAN or HSPA which is reverse to a direction from the E-UTRAN (Evolved UMTS Terrestrial Radio Access Network) or HSPA (High Speed Packet Access) to UTRAN or GERAN in a network, the method performed by a Mobile Switching Centre (MSC) server enhanced for the voice call continuity and comprising:
   acquiring, by the MSC server, an rSRVCC (reverse Single Radio Voice Call Continuity) capability indication of a user equipment (UE) related to the voice call continuity from the UTRAN or GERAN to the E-UTRAN or HSPA, wherein, if the network operates in Network Mode of Operation (NMO) type I, the rSRVCC capability indication is originated from an attach request message sent by the UE and received via a serving GPRS (General Packet Radio Service) support node (SGSN), wherein, if the network operates in Network Mode of Operation (NMO) type II, the rSRVCC capability indication is sent by the UE;

receiving, by the MSC server, a subscriber data including an rSRVCC allowed indication indicating whether the voice call continuity is allowed or not for a user, wherein the subscriber data including the rSRVCC allowed indication is received during an attach procedure for the UE from a home subscriber server (HSS);

determining, by the MSC server, whether the voice call continuity from the UTRAN or GERAN to the E-UTRAN or HSPA is possible or not, based on all of:
    the rSRVCC capability indication;
    the rSRVCC allowed indication; and
    a status of a registration of the UE; and transmitting, by the MSC server, an indicator for indicating whether the voice call continuity is possible or not based on the determination result to a base station controller (BSC) or a radio network controller (RNC).

8. The method of claim 7, wherein, if the network operates in NMO type III, the rSRVCC capability indication is acquired directly from the UE.

9. The method of claim 7, wherein the rSRVCC allowed indication is acquired from the HSS when the UE performs a registration.

10. The method of claim 7, further comprising performing a handover procedure for the voice call continuity.

11. The method of claim 7, wherein, in the determination operation, determining whether a voice call of the UE was initiated by the UE on UTRAN/GERAN and anchored in a Service Centralization and Continuity Application Server (SCC AS).

12. The method of claim 7, wherein the indicator is used to decide cells for which the UE reports measurements that lead to handover.

13. The method of claim 7, further comprising checking the status of the registration.

* * * * *